R. A. MORTON.
PLOW DRAW BAR HEAD AND LEVELER FOR TRACTORS.
APPLICATION FILED MAY 2, 1913. RENEWED FEB. 24, 1917.
1,240,758.
Patented Sept. 18, 1917.
2 SHEETS—SHEET 2.
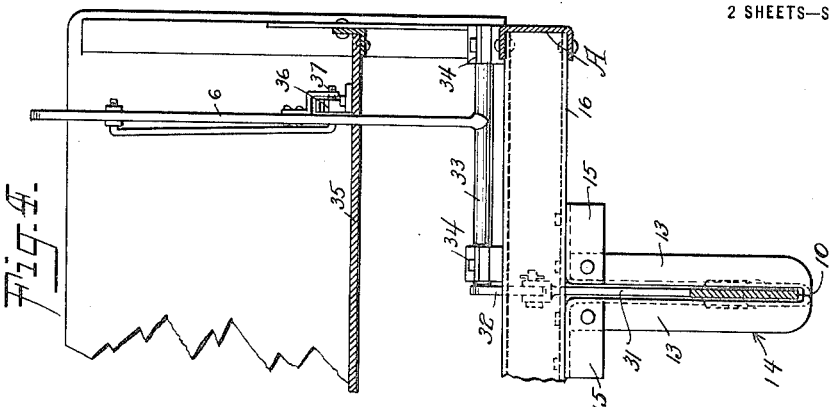
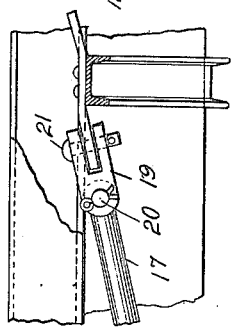
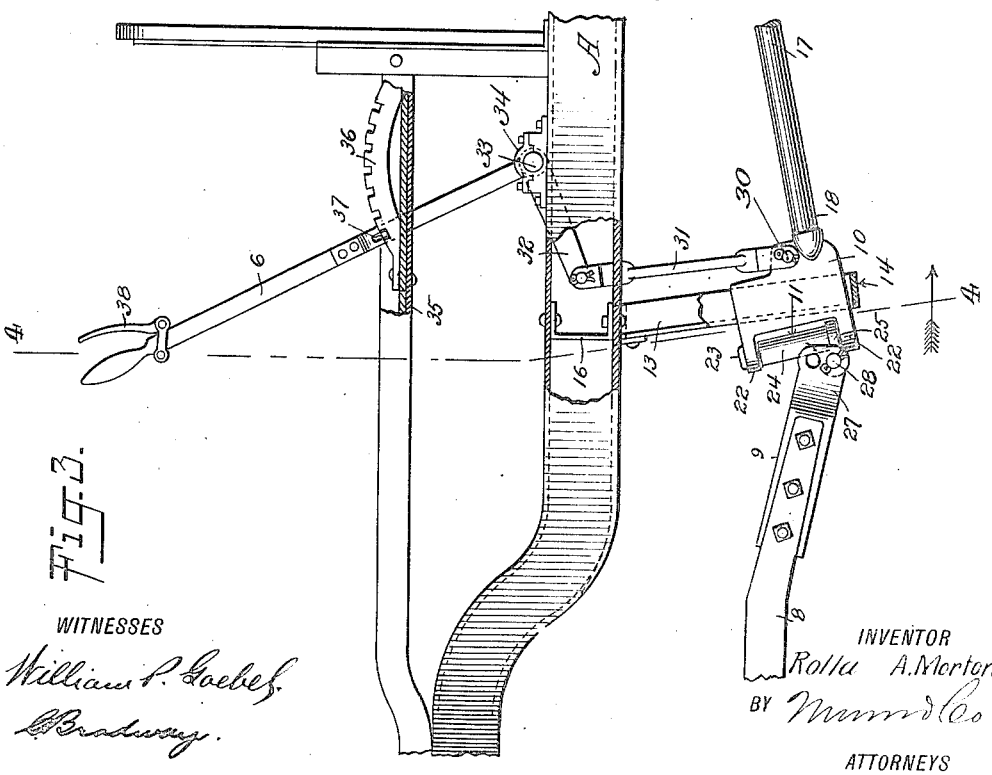
WITNESSES
William P. Goebel
C. Bradway
INVENTOR
Rolla A. Morton
BY Munn & Co
ATTORNEYS

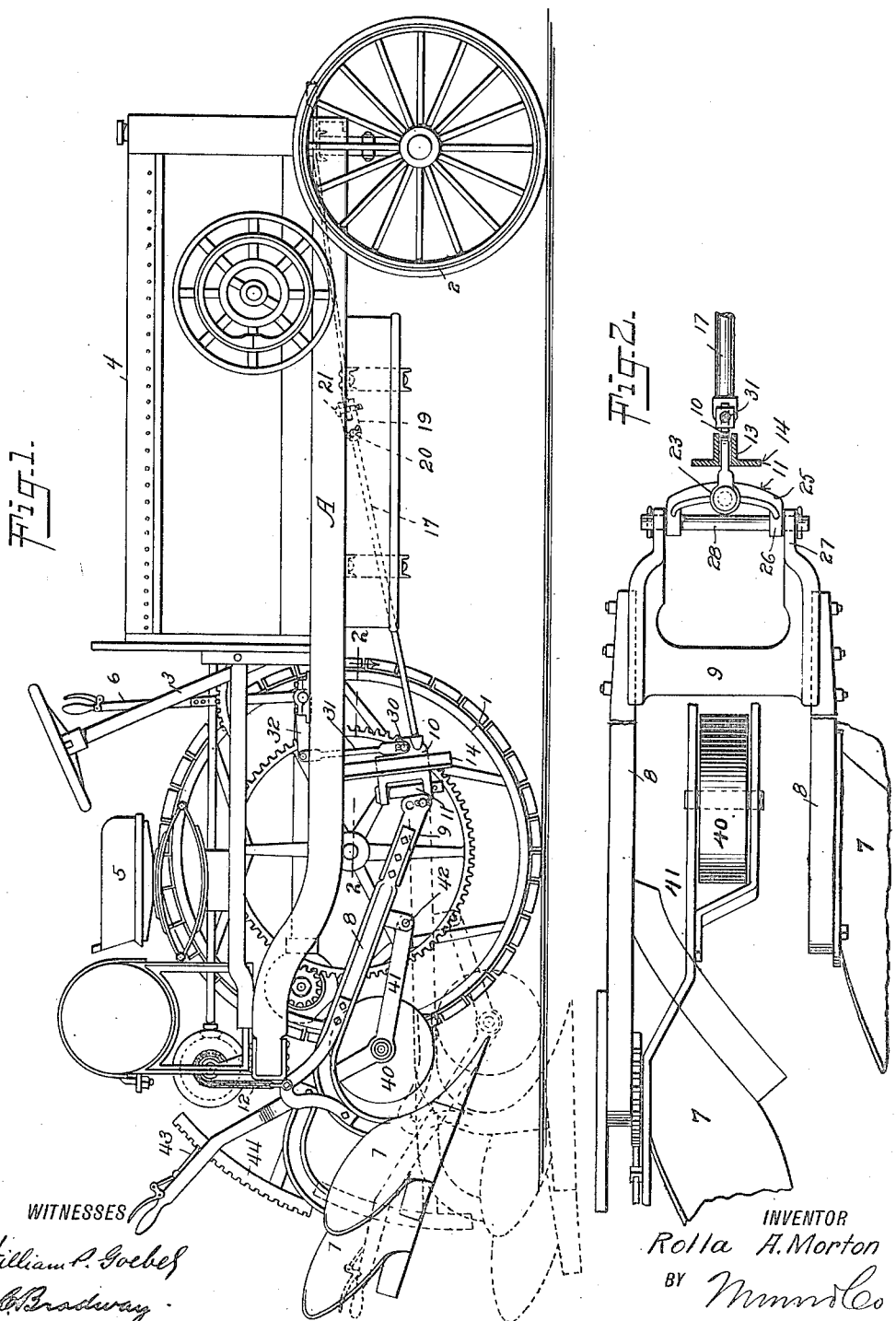

UNITED STATES PATENT OFFICE.

ROLLA ALEXANDER MORTON, OF GALION, OHIO.

PLOW DRAW-BAR HEAD AND LEVELER FOR TRACTORS.

1,240,758.   Specification of Letters Patent.   Patented Sept. 18, 1917.

Application filed May 2, 1913, Serial No. 765,037. Renewed February 24, 1917. Serial No. 150,858.

*To all whom it may concern:*

Be it known that I, ROLLA A. MORTON, a citizen of the United States, and a resident of Galion, in the county of Crawford and State of Ohio, have invented a new and Improved Plow Draw-Bar Head and Leveler for Tractors, of which the following is a full, clear, and exact description.

This invention relates to motor or traction-driven plows in which the plows or other implements are embodied in the tractor as an essential part thereof.

The invention has for its principal object to provide an improved draw bar head construction whereby the plow body is perfectly free to move either up or down or to one side or the other in order to pass around small obstructions in the soil, but is always maintained upright without any means other than the draw bar head.

Another object of the invention is the provision of simple and effective means whereby the plow or other implement may be instantly adjusted by the operator from the operator's seat, for the purpose of maintaining the plow or plows in a level position while operating at any desired depth.

With these objects in view, and others as will appear as the description proceeds, the invention comprises various novel features of construction and arrangement of parts which will be more fully described hereinafter and set forth with particularity in the claims appended hereto.

In the accompanying drawings, which illustrate one embodiment of the invention, and wherein similar reference characters are employed to designate corresponding parts through the several views, Figure 1 is a side view of a tractor with the plows or tilling implements shown in raised position by full lines and in lowered position by the dotted lines, the near driving wheel being removed to better illustrate the detailed construction;

Fig. 2 is an enlarged plan view of the universal connection between the plow beams and draw bar head, the guide for the draw bar head being shown in section on the line 2—2 of Fig. 1;

Fig. 3 is an enlarged fragmentary view of the draw bar head and the elevating means therefor; and Fig. 4 is a transverse section on the line 4—4 of Fig. 3.

Referring to the drawing, A designates the main frame of the tractor that is supported at its rear on traction or driving wheels 1 and at its front on steering wheels 2 that are operatively connected by mechanism (not shown) with the steering post. On the front of the frame is the bonnet or hood 4 which incloses the propelling motor and necessary parts to comprise a complete power system. The operator's seat 5 is located to the rear of the steering post 3, and within reach of the plow leveling lever 6, that is connected with the plow or plows 7 by the mechanism which constitutes the subject matter of the present invention.

As shown in Fig. 2, the front ends of the plow beams 8 are connected together by a plow head or yoke 9, which is united with a vertically movable draw bar head 10 by a clevis 11 or other universal device, the rear portions of the plow beams being suspended on elevating chains or equivalent elements 12, whereby the plows can be raised to inoperative position, as shown by full lines in Fig. 1, or lowered to operative position, as shown by dotted lines. The draw bar head 10 is in the form of a vertically-disposed plate that is vertically movable between the side members 13 of a U-shaped guide 14 which depends from the frame A and is fastened by the lateral arms 15 to a cross beam 16 on the frame of the machine. A draw bar 17 has its end 18 connected with the draw bar head 10 and extends upwardly and forwardly therefrom to connect with the frame A adjacent the forward end thereof. The connecting means between the draw bar 17 and frame A consists of a head 19 united by a horizontal pivot or pin 20 with the draw bar 17, and by an approximately vertical pin or pivot post 21 with the frame A of the machine. The draw bar head 10 has rearwardly-extending lugs 22 which receive the vertical pin or bolt 23 which passes through the tubular body 24 of the clevis 11 or universal device, and extending in opposite directions from this tubular body 24 are arms 25 which are formed at their extremities with bearing eyes 26 that lie between the forwardly projecting arms 27 of the plow head or yoke 9; and passing through the bearing eyes 26 and members 27 of the yoke 9 is a horizontal pivot or pin 28. The pins 23 and 28 and clevis 11 constitute a universal joint between the draw bar head and plows, whereby the latter are free to rise and fall or swing laterally in either direction in order to pass around slight obstacles in the soil. In order to maintain the plows or tilling implements level for any desired depth of penetration of the same in the soil the draw bar head 10 is capable of vertical adjustment, and for this purpose the draw bar head 10 is connected at 30 to the lower end of a link 31 which extends upwardly and connects with a rearwardly-extending arm 32 on the shaft portion 33 of the leveling lever 6. The shaft portion 33 of the lever is journaled in bearings 34, Fig. 4, supported on the frame A, and above the shaft on the floor or platform 35 is a toothed quadrant or latch bar 36, with which coöperates a latch 37 mounted on the leveling lever and connected with an operating device 38 at the handle of the lever.

When the operating lever is locked in the position shown in Fig. 3 the draw bar head is in its lowermost position, corresponding to the maximum depth of penetration of the plows. When it is desired to plow at a lesser depth the leveling lever 6 is thrown forwardly to cause the draw bar head 10 to be raised through the movement of the arm 32 and link 31, and by locking the lever at the required adjustment the draw bar head is maintained immovable in the guide 14. Coöperating with the plows is a roller 40 mounted on a lever 41 fulcrumed at 42 on the plow beam, this lever being held in any desired position by a latch 43 engaging at a suitable point the toothed segment 44 carried by the plows. By adjusting the roller 40 which rides on the unplowed surface of the ground the depth of penetration of the plows can be controlled. By vertically adjusting the draw bar head 10 the plows can be maintained level for every adjustment of the depth controlling roller 40.

As stated hereinbefore, the principal object of the invention is to employ a single draft connection between the plow and body of the machine, which connection will always maintain the side of the plow or plows perpendicular, while at the same time permitting the plow to freely move to one side or the other or up and down to avoid obstructions, and at the same time only a single gage or depth wheel is required for either one or two plows. When two plows are employed the gage wheel is located centrally between them to run on the surface of the unplowed soil. The elevating chains 12 have no effect whatever in assisting to maintain the plows upright, or with the landsides perpendicular with the frame of the machine, this position being maintained by the fixed vertical guide 14 on the frame of the machine and the draw bar head 10 slidable vertically in such guide. This single draft connection formed by the guide 14, draw bar 10 and clevis 11 is always under the control of the operator from the seat by means of the lever 6, and this draft connection can be raised or lowered to vary the position of the plow vertically, as it will be understood that the plow will follow the point of connection between the forward end of its beam and body of the machine, and yet the plow has free lateral or up and down movement without in any way interfering with the steering or guiding of the machine.

The guide 14 is so constructed as to provide a substantial bearing for the draw bar head thereon and to maintain the head in a vertical position with relation to the frame or body of the machine with comparatively little strain or wear on the parts. Furthermore, the hub 24 of the clevis is comparatively long and the arms 25 are spaced far apart and at right-angles to the hub so that when either one or two plows are fastened to the clevis they are always held perfectly level or upright with relation to the frame of the machine, whether the draw bar head be high or low in the guide 14. In opening a new or first furrow the adjustable drive wheel is lowered until the plow has the desired tilt or slant to open a furrow easily, and after the first furrow is made the drive wheel is set to the depth of the furrow so that the plow then is held in a perfectly level position, not tilting to one side or the other.

From the foregoing description taken in connection with the acompanying drawings, the advantages of the method of operation and of the apparatus shown will be readily understood by those skilled in the art to which the invention appertains, and while I have described the apparatus which I now consider to be the best embodiment thereof, I desire to have it understood that the apparatus shown is merely illustrative, and that such changes may be made when desired as are within the scope of the appended claims.

Having thus described my invention, I claim as new and desire to secure by Letters Patent:

1. A machine of the class described comprising a frame, an implement carried thereby, a draw bar head, a connecting device connected with the draw bar head and implement on right-angular disposed axes for permitting sidewise and vertical movement of the implement with respect to the draw bar head, a fixed guide on the frame for the draw bar head, and a draw bar connected rigidly with the head and pivotally with the frame at a point in advance of the said guide.

2. A machine of the class described comprising a frame, an implement carried thereby, a draw bar head, a connecting device connected with the draw bar head and implement on right-angular disposed axes for permitting sidewise and vertical movement of the implement with respect to the draw bar head, a fixed guide on the frame for the draw bar head, a draw bar connected rigidly with the head and pivotally with the frame at a point in advance of the said guide, and leveling mechanism mounted on the frame and connected with the draw bar head for raising and lowering the same.

3. A machine of the class described comprising a wheel-supported body, a pair of connected plows, a gage wheel carried by the plows and disposed between the same, and a single connection between the plows and body portion, said connection comprising a guide disposed at right-angles to the plane of the body, a member slidable on the guide, and a connecting element between the plows and member including two pivotal axes at right-angles to each other, one of the axes lying in a plane co-incident with the said guide, whereby the plows can freely rise or fall and move laterally while the sides of the plow are maintained parallel with the said guide.

4. A machine of the class described comprising a wheel-supported frame, a tilling implement having a beam, a vertically disposed plate arranged in front of the beam and pivotally connected therewith, a rigid vertically disposed guide on the frame and through which the plate extends forwardly from the beam, a connecting element secured to the plate at a point in front of the guide and having its forward end connected with the frame, and an elevating device mounted on the frame and connected with the said plate for raising and lowering the latter.

5. A machine of the class described comprising a wheel-supported frame, a tilling implement disposed under the frame and having a forwardly-extending beam, a depending fixed guide rigid on the frame and disposed in front of the forward end of the beam, a draw-bar head movable up and down in the said guide, a universal connection between the rear part of the said draw-bar head and front of the beam, a draw-bar having its rear end connected with the draw-bar head and its front end connected with the frame, and a device mounted on the frame and connected with the draw-bar head to raise and lower the same.

6. A machine of the class described comprising a wheel-supported frame, a tilling implement provided with a beam, a fixed guide mounted on the frame at a point in front of the forward extremity of the beam, a draw-bar head extending through the guide, a clevis between the beam and draw-bar head, a vertical pivot connecting the clevis with the said head, a horizontal pivot connecting the clevis with the beam, a draw-bar connecting the draw-bar head with the frame at a point in front of the guide, and a device for supporting the draw-bar head and adjusting the same to different positions in the said guide.

In testimony whereof I have signed my name to this specification in the presence of two subscribing witnesses.

ROLLA ALEXANDER MORTON.

Witnesses:
R. W. JOHNSTON,
A. W. LEWIS.